US009153847B2

(12) United States Patent
Harty (10) Patent No.: US 9,153,847 B2
(45) Date of Patent: Oct. 6, 2015

(54) GRID CONNECTED SOLAR BATTERY CHARGING DEVICE FOR HOME AND VEHICLE ENERGY MANAGEMENT

(75) Inventor: Ryan Douglas Roy Harty, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 13/289,612

(22) Filed: Nov. 4, 2011

(65) Prior Publication Data

US 2013/0113413 A1 May 9, 2013

(51) Int. Cl.
*H02J 7/35* (2006.01)
*H01M 10/46* (2006.01)
*B60L 11/18* (2006.01)
*H02J 3/32* (2006.01)

(52) U.S. Cl.
CPC ........... *H01M 10/46* (2013.01); *B60L 11/1816* (2013.01); *B60L 11/1824* (2013.01); *B60L 11/1842* (2013.01); *B60L 11/1848* (2013.01); *H01M 10/465* (2013.01); *H02J 7/35* (2013.01); B60L 2230/22 (2013.01); B60L 2230/30 (2013.01); H01M 2220/20 (2013.01); *H02J 3/32* (2013.01); Y02B 10/14 (2013.01); Y02E 10/566 (2013.01); Y02E 60/721 (2013.01); Y04S 10/126 (2013.01)

(58) Field of Classification Search
CPC .................................... H02J 7/35; Y02E 60/12
USPC ......................................................... 320/101
See application file for complete search history.

(56) References Cited

U.S. PATENT DOCUMENTS

| 5,315,227 | A * | 5/1994 | Pierson et al. ................. 320/101 |
| 7,495,351 | B2 * | 2/2009 | Fein et al. ..................... 290/1 R |
| 7,884,569 | B2 * | 2/2011 | Ward ............................ 320/101 |
| 2008/0039989 | A1 * | 2/2008 | Pollack et al. .................. 701/22 |
| 2009/0266397 | A1 * | 10/2009 | Gibson et al. ................. 136/244 |
| 2010/0076615 | A1 * | 3/2010 | Daniel et al. .................. 700/293 |
| 2010/0114798 | A1 * | 5/2010 | Sirton .......................... 705/412 |
| 2010/0138066 | A1 * | 6/2010 | Kong ............................ 700/295 |
| 2010/0177450 | A1 * | 7/2010 | Holcomb et al. ............... 361/19 |
| 2010/0181957 | A1 * | 7/2010 | Goeltner ....................... 320/101 |
| 2010/0252088 | A1 * | 10/2010 | Fein et al. ..................... 136/244 |
| 2010/0256830 | A1 * | 10/2010 | Kressner et al. .............. 700/291 |
| 2011/0133688 | A1 * | 6/2011 | Ishibashi ....................... 320/101 |
| 2011/0156634 | A1 * | 6/2011 | Lai ................................ 320/101 |
| 2012/0249065 | A1 * | 10/2012 | Bissonette et al. ............ 320/109 |

OTHER PUBLICATIONS

Lamb, Stefankos, Smith, Krakow, Hernandez, Rodriquex, Kovac, "Efficient Photovoltaic Charging of Electric Vehicles", Southcon/94 Conference Record, 1994, pp. 47-52.
Vaidya, Stefankos, Krakow, Lamb, Arbogast, Smith, "Direct DC-DC Electric Vehicle Charging with a Grid Connected Photovoltaic System", Conference Record of the 25$^{th}$ IEEE Photovoltaic Specialists Conference (PVSC), May 13-17, 1996, Washington, DC, pp. 1505-1508.

* cited by examiner

*Primary Examiner* — Edward Tso
*Assistant Examiner* — Jerry D Robbins
(74) *Attorney, Agent, or Firm* — Fay Sharpe LLP (57) ABSTRACT

A battery electric vehicle charging station is disclosed, having grid and vehicle connections with a DC charger and controller that selectively charges the vehicle battery directly with DC power in a first mode and converts DC power from the vehicle battery to drive an inverter in a second mode to provide AC power to a power grid.

16 Claims, 4 Drawing Sheets

GRID CONNECTED SOLAR BATTERY CHARGING DEVICE FOR HOME AND VEHICLE ENERGY MANAGEMENT

BACKGROUND

The present disclosure relates generally to a charging station that can selectively provide DC power to charge a battery based vehicle on a determined mode of operation. Because battery electric vehicles (BEVs) and plug-in hybrid vehicles (PHEVs) (collectively called Plug-In Vehicles (PEVs)) have only recently been introduced in mainstream market channels, electric vehicle charging infrastructure is limited in the United States and elsewhere. Hybrid electric vehicles (HEVs), including PHEVs, include hybrid technology allowing the vehicle to operate using fossil-fuel for propulsion and battery charging, and some electric vehicle designs provide an on-board internal combustion engine dedicated to driving a generator to charge the vehicle battery. If on-board propulsion or charging facilities are depleted or unavailable and the vehicle battery presently has a low state of charge (SOC) for the electric propulsion system, the vehicle must be brought to a charging station before the battery is completely depleted.

A typical charging system includes a station operatively coupled to an AC power source. The PEV generally includes an AC charger that can receive AC power from an AC power source. However, the PEV operates on direct current (DC) power from an on-board vehicle battery, and AC chargers must convert AC power to DC power via internal rectifier circuitry to charge the vehicle battery, and this conversion creates an undesirable loss of energy. Thus, there is a need for improved PEV charging systems and techniques by which charging inefficiencies can be reduced while providing flexibility in charging options.

SUMMARY

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

Some charging systems include a charging station capable of receiving power from multiple power sources, including grid power from a utility as well as solar panels and/or other alternative power sources. The charging station provides power to the PEV battery in certain operating modes, and may employ such alternative sources, for example, when a primary AC power source cannot provide sufficient power. However, instances are contemplated in which the vehicle battery becomes fully charged, and an amount of DC power stored by the vehicle battery may surpass the needs of the driver. Therefore, it may be desirable to draw DC power from the surplus vehicle battery charge for other uses. With the current spotlight being on energy efficiency and clean energy sources, it may be desirable to partially discharge the vehicle battery and provide the surplus charge to the power grid. The present disclosure provides a charging station that can operate as an alternate AC power provider to support grid power needs while allowing direct DC charging of a vehicle battery.

A PEV charging station and PEV charging method are disclosed in which various modes of operation are selected for providing DC power to and from a battery electric vehicle. These concepts may be advantageously employed to facilitate travel using DC power stored in the vehicle battery, while also selectively providing power to the grid using surplus power stored in the battery, thus increasing energy efficiency and potentially providing savings to the user.

A charging station is disclosed, having a DC charger and an inverter operatively coupled to a controller. The inverter includes a DC input operative to receive DC input power and is operative to convert DC input power to drive an inverter AC output to provide AC output power to the AC power grid. The DC charger includes a DC input that is operative to receive power from at least one DC power source, such as a local storage battery, a solar panel, a rectifier driven from grid power, etc. The DC charger further includes a DC vehicle battery interface that is coupleable to a PEV DC battery connection for direct DC charging and for selectively drawing power from the vehicle battery. The DC charger also includes a DC charger output coupleable to a DC inverter input to provide DC power to the inverter. The DC charger is operative in a first mode to provide power from the charger DC input to the vehicle battery interface. In a second mode, the DC charger provides power from the vehicle battery interface to the charger DC output. The controller is operatively coupled with the DC charger to selectively switch the DC charger from the first mode to the second mode.

In certain embodiments, the controller receives an indicator from an external information source and selectively switches the DC charger mode between the first and second modes based at least partially on the indicator. The indicator, for example, may include a current price rate for AC power provided to the AC power grid, and the controller selectively switches the charger to the second mode if the price rate is greater than a threshold. In another embodiment, the indicator may include a grid status, and the controller selectively switches the DC charger to the second mode if the grid status is unstable. In another embodiment, the indicator may include the presence of significant quantities of renewable generation on the grid (such as wind generation at night), and the controller selectively switches the DC charger to the first mode to maximize the use of renewable electricity. The external information source may be a user interface operative to receive a user-command for switching the DC charger mode. The controller may thus facilitate intelligent and/or user-driven switching to provide grid power derived from excess energy stored in the vehicle battery.

A method is provided for operating a PEV charging station, including selectively operating a PEV battery charging system in one of two modes. In the first mode, DC current is directed from a DC power source through a DC vehicle battery interface to a vehicle battery. In the second mode, DC current is directed from the vehicle battery through the DC vehicle battery interface and through the DC charger to an inverter DC input. The DC current is then converted to AC current using an AC inverter and the AC current is directed through an inverter AC output to an AC power grid.

Certain embodiments include selectively operating the DC charger in a third mode in which AC current from the grid is converted using a rectifier and DC current from the rectifier is used to charge the vehicle battery. In certain embodiments, moreover, the charging system is operated in a fourth mode if no PEV is connected to the DC vehicle battery interface, in which DC current is directed from a solar panel through the inverter DC input for directing AC current to the AC power grid.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

One or more embodiments or implementations are hereinafter described in conjunction with the drawings, where like reference numerals are used to refer to like elements throughout, and where the various features are not necessarily drawn to scale. The disclosure relates to plug-in vehicles (PEVs), and to a charging station that uses various operation modes to charge PEVs using DC power. The disclosure more particularly relates to a PEV charging station and charging method that provides power to the PEV in a first mode and provides power to an energy source in a second mode, for instance, when the state of charge (SOC) of the PEV battery exceeds a need or surplus.

Figure 3:
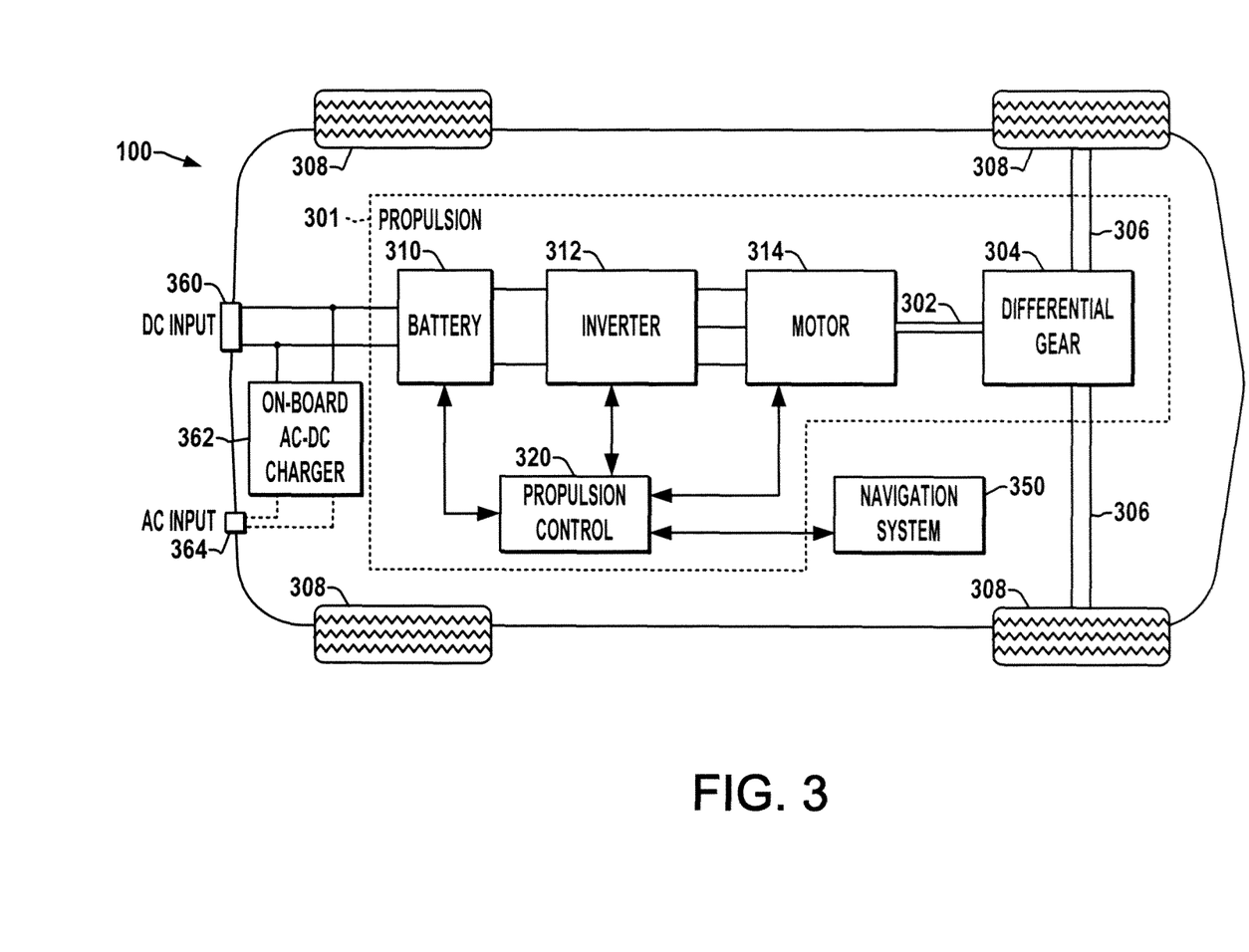
FIG. 3 illustrates an exemplary plug-in vehicle (PEV) having a vehicle DC input for receiving DC power in accordance to various aspects of the disclosure; and, FIG. 4 is a flow diagram illustrating an exemplary mode selection process for a PEV charging station according to various aspects of the disclosure.

Referring initially to FIG. 3, an exemplary plug-in vehicle (PEV) 100 is illustrated having a vehicle DC input 360 for receiving and providing DC power from or to a charging station in accordance with one or more aspects of the disclosure. The PEV 100 includes a propulsion system 301 having an electric motor 314 with a shaft 302, a front wheel drive axle 306 and a differential gear 304 for propelling the vehicle 100 via wheels 308. The propulsion system 301 further includes a battery 310 providing DC current to a inverter 312, which in turn provides AC current to the motor 314 coupled by output shaft 302 with the axle 306 via the differential gear 304. The electric motor 314 drives the shaft 302 to transfer motive power to the differential gear 304, which transmits the motive power to the front wheels 308 by the axle 306 to propel the vehicle 100. One or more additional gears (not shown) may be included.

The battery 310 can be any suitable single or multiple battery configuration to supply DC power to the motor 314, for example, a nickel metal hydride, lithium ion, or similar battery, and DC-DC boost circuitry such as a DC-DC converter (not shown) may be included to adjust the DC output of the battery 310 to any level suitable for providing an input to the inverter 312. The inverter 312 receives the DC power directly or indirectly from the battery 310 and converts it to AC power to control the drive motor 314 to drive front wheels 308. The drive system may include one or more alternative charging means for charging the battery 310, for example, where the motor 314 may operate as a generator during vehicle braking to convert rotational energy from the wheels 308 into electrical energy, with the inverter 312 or other circuitry converting such power to DC current to charge the battery 310. In addition, the vehicle battery 310 may be charged using an on-board AC-DC charger 362 from an externally supplied AC source coupled to an AC input 364 or the battery 310 in this example can be directly charged from an external DC source (such as the exemplary charging station of FIG. 1) using a direct DC charging input 360 as described in greater detail below.

A propulsion controller 320 in the vehicle 100 controls the inverter 312 according to driver inputs from sensors (not shown) associated with the vehicle 100. The propulsion controller 320 can be implemented as any suitable hardware, processor-executed software, processor-executed firmware, programmable logic, or combinations thereof, operative as any suitable controller or regulator by which the motor 314 and/or the inverter 312 can be controlled according to one or more desired operating values such as speed setpoint(s). The controller 320 obtains a state of charge (SOC) signal or value from the battery 310 or from a controller associated therewith (not shown). The propulsion control unit 320 in certain embodiments calculates an output that the driver requests and determines the vehicle speed from an output signal or provided value. From these, the propulsion controller 320 determines a required driving power for controlling the inverter 312 and thus the motor 314, where the inverter control can include one or both of speed control and/or torque control, as well as other motor control techniques.

The vehicle 100 further includes an on-board navigation system 350, which can be implemented as a processor-based computing device with corresponding programming instructions. The navigation system 350 communicates with the propulsion controller 320 and also directly or indirectly communicates with a charging station (e.g., FIG. 1) when coupled with the DC input 360, for example, to provide an expected driving distance of a route programmed into the system 350 by a user, or to provide a corresponding expected SOC value required to drive the vehicle 100 on a programmed route stored in the navigation system 350.

With continued reference to FIG. 3, an on-board AC/DC charger 362 is provided. A vehicle AC input 364 receives AC current from an AC power source to charge the vehicle battery 310. In a typical charge operation, the vehicle AC input 364 is coupled to the AC power source using an AC power source connection, and the on-board AC/DC charger 362 converts the AC power to DC power. The AC/DC charger 362 provides DC power to the vehicle battery 310. One advantage of the vehicle DC input 360 provided on the PEV 100 is an ability to supply DC power to the motor 314 directly from a DC power source without the inefficiency inherent in an AC-DC conversion required when instead using the on-board AC-DC charger 362.

Figure 1:
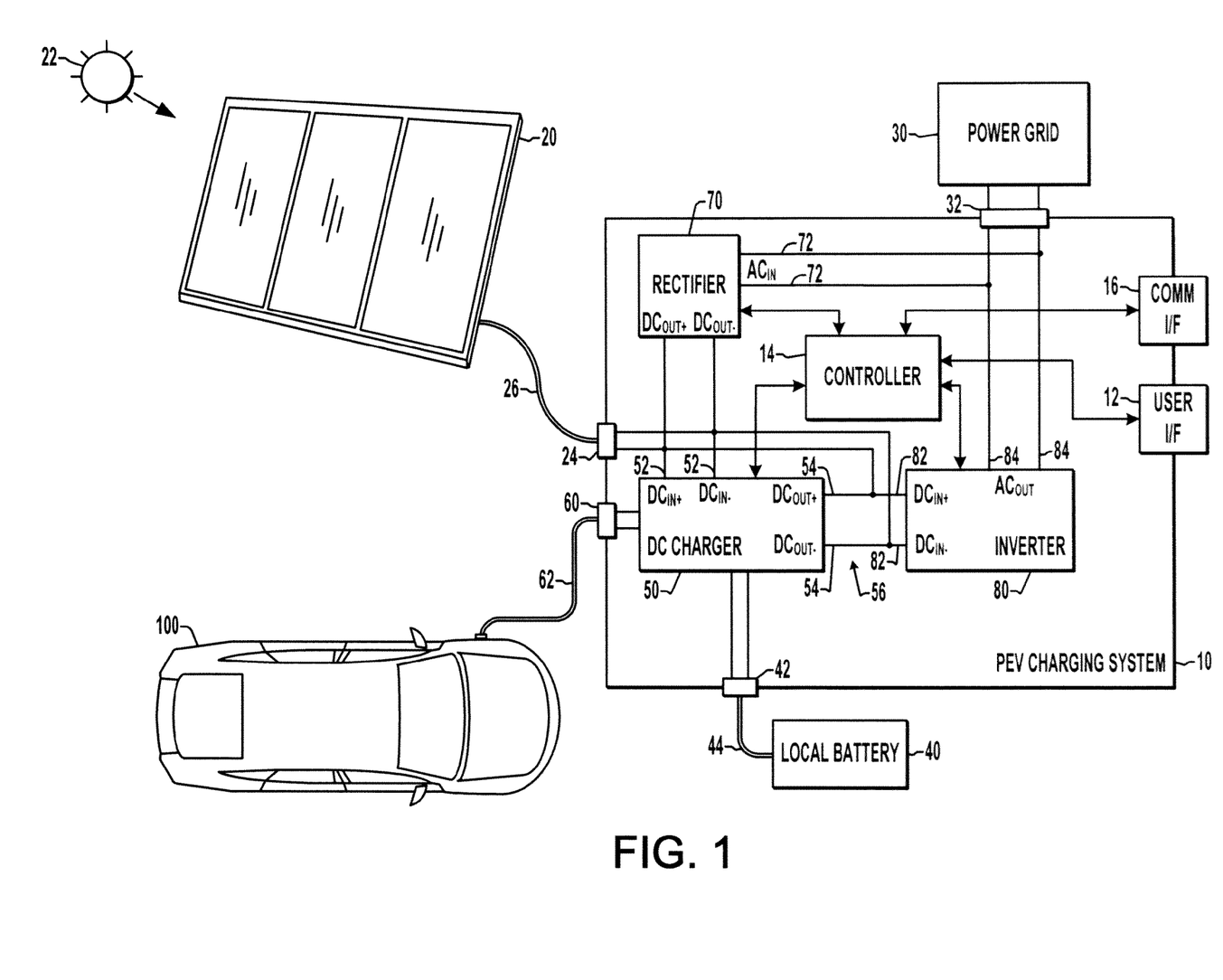
FIG. 1 is a schematic diagram illustrating a charging system according to various aspects of the disclosure.

FIG. 1 illustrates an exemplary charging system 10 (hereinafter synonymously referred to as "charging station") with the ability to selectively use vehicle battery power to supplement an AC power grid according to one or more aspects of the disclosure. The charging system 10 may be contained in a housing (not shown) adapted for mounting in a garage or for support in a similar parking facility. The charging system 10 is not limited to home or garage use. Rather, the housing may be included as part of a kiosk that is mounted to a support unit or on a support surface that is situated in proximity to a PEV parking spot to provide a PEV 100 with selective access to the charging system 10. The housing may include a user input/output interface 12. The interface 12 may communicate with a display for displaying information to users, and may further include an input device, such as a keyboard, a microphone, or a touch or writable screen, for inputting instructions, and/or a cursor control device, such as a mouse, trackball or the like, for communicating user input information and command selections to a controller 14. The interface 12 may include a network interface, which allows the controller 14 to communicate with other devices via a computer network, such as a local area network (LAN), a wide area network (WAN), or the Internet.

The controller 14 includes a memory and a processor for processing instructions stored in the memory to implement the features and functions described herein as well as other tasks associated with operation of a charging station. The controller 14 is operable to receive instructions entered by the user at the interface 12 and/or to receive one or more indicators provided from an external source by a communication interface 16. Instructions stored in the memory of the controller 14 include a mode determination component directed toward selectively providing DC or AC power based on input received by the various interfaces.

The charging system 10 is operatively coupled to various power sources, one of which is a photovoltaic source 20 (hereinafter referred to as solar panel). The solar panel 20 may include multiple panels operable to generate electrical power by converting solar radiation emitted from the sun 22 into direct current electricity. The solar panel 20 provides DC power to the charging station 10 via a photovoltaic interface 24. It is anticipated that the solar panel 20 may be included at or in proximity to the facility containing the charging system 10. A photovoltaic array may be associated with a building, as either integrated thereto or mounted thereby, or as a standalone device. The solar source 20 advantageously provides a green source for PEV battery charging and may be particularly advantageous where grid power is expensive. However, the solar panel 20 may not be able to provide constant DC power in a 24-hour period because of limited daylight hours for converting energy from the sun 22 into electricity. In particular seasons, the period of sunlight is also shortened. Furthermore, the needs of the driver may require that the DC power stored in the vehicle battery 310 is present in an amount that is greater than the solar panel 20 is able to provide.

Accordingly, the charging station 10 may be further coupled to an electrical grid or any electrical network (hereinafter referred to as power grid 30). The power grid 30 generates, transmits and distributes AC power from a grid location remote from the charging station 10. The power grid 30 is operable to provide AC power to the charging station 10 through a power grid interface 32.

As mentioned, the charging station 10 can provide charging power to the vehicle battery derived from a number of different sources. There is no limitation made herein to the number of interfaces provided on the charging system for coupling the system to power sources. With continued reference to FIG. 1, another power source for providing power to the charging station 10 may include a local storage battery 40. The local storage battery 40 is coupled to the charging station using a battery connection 44 via an interface 42. In an exemplary embodiment, the local storage battery 40 stores a surplus supply of DC power, such as power received from the solar panel 20 when no vehicle battery charging is underway. This DC power may then be provided to the PEV 100 using the charging station 10 at a later time. The local battery 40 may provide this DC power through the battery interface 42. At any time, moreover, the local charging station 10 can charge the local storage battery 40 to store excess grid power and/or solar energy output when the PEV 100 is not connected to the charging station or when otherwise desirable.

FIG. 1 further illustrates the PEV 100 connected to a DC charger 50 of the charging system 10 through a DC vehicle battery interface 60. The DC charger 50 is operable to receive DC power at a first voltage from a first source (e.g., from the solar panel 20, from the local battery 40, from a rectifier 70, etc.) and to provide the DC power to a second source (e.g., to the vehicle battery) at a second voltage. The first voltage may equal or differ from the second voltage, where the charger 50 may include level conversion circuitry (not shown) to perform any such level adjustment. A charger DC input 52 is operative to receive the DC power from the first source. The solar panel 20 is coupled to the photovoltaic interface 24 of the charging station 10 using a photovoltaic source connection 26, and the charger DC input 52 receives DC power from the solar panel 20. The DC charger 50 may alternatively receive input DC power from the rectifier 70 or from the local storage battery 40, which is coupled to the battery interface 42 of the charging station 10.

In a first mode, the DC charger 50 provides the DC power from the charger DC input 52 to the vehicle battery interface 60 for direct DC charging of the vehicle battery. The vehicle battery interface is coupled to the PEV DC battery connection 62, which provides the DC power to the vehicle DC input included on the PEV 100 (see 360 of FIG. 3). In a second operating mode, the charger 50 directs DC power from the vehicle battery to a DC output 54 to drive an inverter 80 to provide AC output power to the grid 30.

With continued reference to FIG. 1, a rectifier 70 is another power source from which the charger DC input 52 is operative to receive DC power. The rectifier 70 in certain embodiments is integrated into the charging system 10. The rectifier 70 is operative to selectively convert AC power from the grid 30 to DC power for use in charging the vehicle battery and/or the local storage battery 40. Accordingly, the rectifier 70 is coupled to the power grid 30 at the power grid interface 32 and includes a rectifier AC input 72 that is operative to receive AC power from the AC power grid 30. A rectifier DC output provides the converted DC power to the charger DC input 52.

The controller 14 selectively determines which power source is used to provide DC power to the input of the DC charger 50. An aspect of the present disclosure involves use of the PEV vehicle battery 310 as a suitable power source when a supply of DC power is stored in the vehicle battery, particularly where the controller 14 can ascertain that the vehicle state of charge (SOC) exceeds the amount required to traverse a route programmed into the vehicle navigation system, or where it is expected that the vehicle battery can be recharged (in whole or in part) prior to being driven on a selected route, or in other situations, such as where the current cost of grid power warrants conversion of vehicle battery charge to supply AC power to the grid 30 or in an unstable grid condition. For instance, the exemplary charging station 10 is operable to use the vehicle battery 310 (FIG. 3) as a power source when an amount of DC power stored in the vehicle battery exceeds needs of the driver, or when a grid power cost exceeds a threshold, or when a user interface input requests such a transfer, or when the condition of the grid is indicated to be unstable.

In one scenario, a utility company (not shown) generates AC power and distributes it to one or more grids (e.g., grid 30), by which it is further provided to consumers. The AC power is provided at a certain rate (cost), which is typically based on kilowatts consumed in an hour ("kWh"), which may be fixed or variable, and different rates may be applied for different consumers. In certain regions, the rate is a computed price based on consumption and demand. Accordingly, a utility company may selectively lower and/or increase rates based on certain influxes observed in the market. For example, the rates in certain regions are lowered during evening hours because there may exist a lower demand for power. In some instances, the utility company lowers the rate to encourage consumers to use the energy during off-peak periods. Rates may be set according to various market clearing houses, such as, for example, the California Independent System Operator (CAISO) or the PJM Interconnection (PJM).

The power grid 30 receives AC power from multiple generation means, such as, for example, industrial power plants, coal plants, nuclear plants, hydroelectric plants, and windmills, etc. Moreover, the utility company is also capable of buying energy from its consumers. The exemplary charging system 10 is operable to selectively sell to the utility company a surplus of DC power contained in the vehicle battery 310 by selective operation of the DC charger 50 in a second operational mode to provide a DC output 54 to power an inverter 80 to generate and provide AC power to the grid interface 32 by conversion of stored vehicle battery power.

With continued reference to FIG. 1, the charging station 10 includes an inverter 80 coupled to the DC charger 50 and the power grid 30. An electrical connection 56 couples the charger DC output 54 to the inverter DC input 82 for providing DC output power to the inverter 80. In one embodiment, the inverter DC input 82 is coupled electrically to a second DC power source, which also provides DC power to the inverter 80. As is illustrated in FIG. 1, the inverter DC input 82 is coupled to the photovoltaic interface 24 for receiving DC power provided by the solar panel 20. The inverter DC input 82 receives DC input power and the inverter 80 converts the DC input power to AC output power. An inverter AC output 84 provides AC output power to the AC power grid 30 via the interface 32. The inverter AC output 84 is represented as including two lines in FIG. 1, although a multi-phase connection can be used and there is no limitation made herein to a number of phase lines used for the AC electrical connections used in the charger station 10.

As mentioned, the present charging station 10 is operative in a first mode to provide DC power from the charger DC input 52 to the vehicle battery interface 60 for charging the vehicle battery using DC input power received from any of the solar panel 20, the rectifier 70 and/or the local battery 40. The inverter 80 allows the DC charger 50 to selectively operate in a second mode, wherein the DC charger 50 is operative to provide DC power from the vehicle battery interface 42 to the charger DC output 54, thereby allowing provision of auxiliary grid power using the inverter 80. The controller 14 is operatively coupled with the DC charger 50 to selectively switch the DC charger 50 from the first mode to the second mode.

Figure 2:
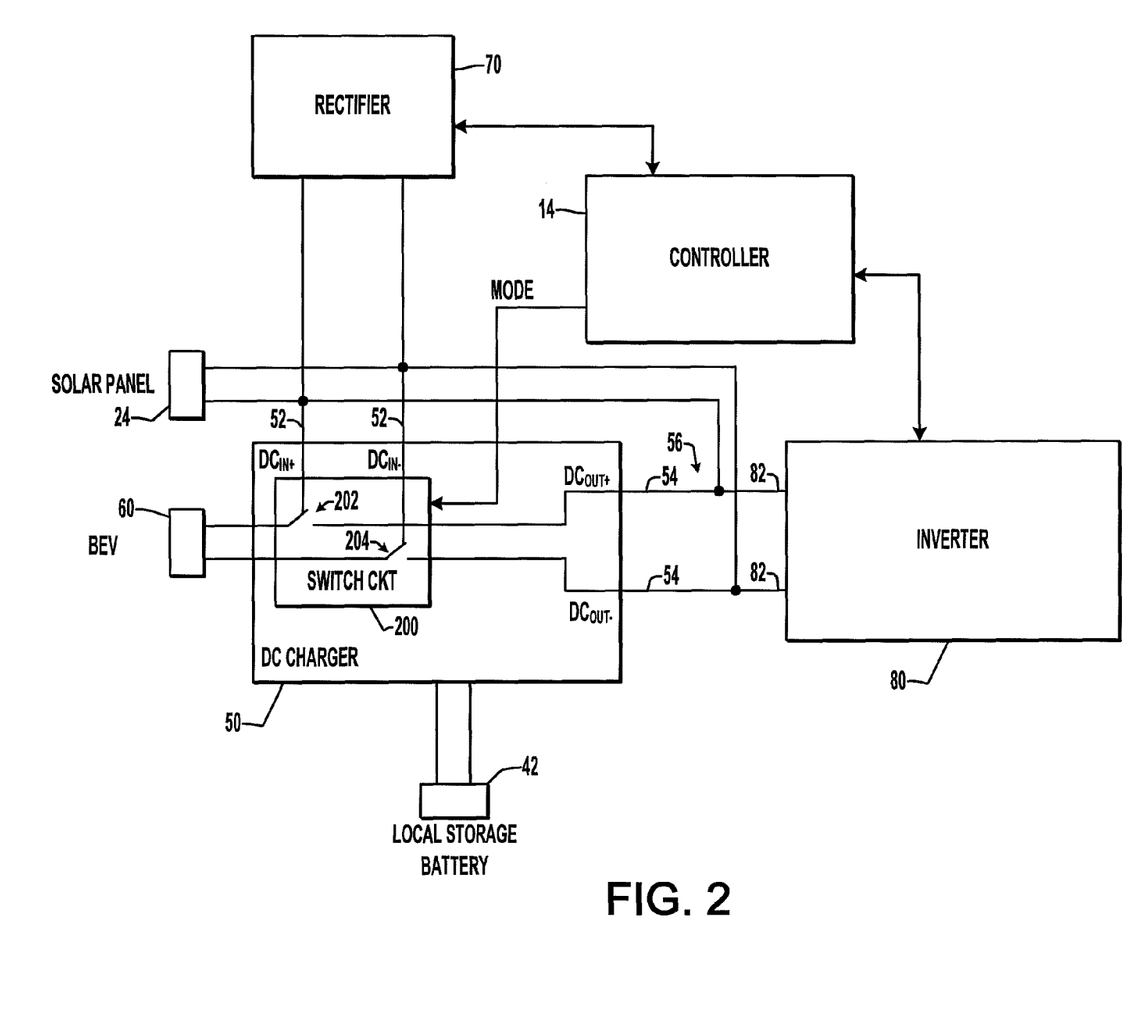
FIG. 2 is a partial schematic diagram illustrating a charging station showing an operating scheme for multiple modes of operation according to various aspects of the disclosure.

With reference to FIG. 2, a partial schematic diagram of the charging station 10 is shown, illustrating further details of the DC charger 50. The DC charger 50 selectively switches from the first mode to the second mode using a switch circuit 200. In the first mode, the switch 200 selectively operates in a first position (shown in the figure). More particularly, the switch 200 in this example includes two contacts 202 and 204 and closes a first circuit 202 formed between the positive charger DC input 52 ($DC_{IN+}$) and the corresponding positive connection of vehicle battery interface 60. The switch simultaneously closes a second circuit 204 formed between the vehicle battery interface and the negative charger DC output 52 ($DC_{IN-}$). The switch 200 thus connects the DC input 52 with the PEV battery interface 60 so that DC current may flow from a DC power source 20, 40, 70 to the vehicle battery 310, and no power is provided to the inverter 80 when the DC charger 50 is operating in the first mode. Accordingly, the charging station 10 charges the PEV battery 310 provides DC power to the vehicle battery in the first mode.

With continued reference to FIG. 2, the charging station 10 is operable to receive DC power from the vehicle battery 310 when the DC charger 50 is operating in the second mode. In the second mode, the switch 200 selectively operates in a second position with the first contact 202 connecting DC the positive PEV interface connection to the positive DC output terminal 54 ($DC_{OUT+}$) and with contact 204 connecting the negative PEV interface connection to the negative output 54 $DC_{OUT-}$. In this mode, DC current cannot flow from any of the DC power sources 20, 40, or 70 to the vehicle battery 310, and instead, DC output power may be provided from the PEV battery to the inverter DC input 82, and the DC output power is converted to AC output power for delivering to the power grid 30.

The controller 14 may operate other switching circuitry in the DC charger 50 for other modes of operation in the charging station 10. In certain embodiments, for example, the switch 200 can have three positions (not shown) selectable by the controller 14. For example, a third position may operate to open both the first and second circuit contacts 202, 204, and DC power may be provided by the photovoltaic interface 24 directly to the inverter DC input 82 for providing power to the grid 30. In this manner, the DC charger 50 may selectively sell power generated by the solar panel 20 to the AC power grid 30, for instance, when the PEV 100 is not connected to the charging station 10 or otherwise is fully charged (or charged enough to accommodate any planned trips), or when the PEV is connected to the AC power grid at a different location. In this mode of operation, DC current is directed from the solar panel 20 to the inverter DC input 82, and the DC current is converted to AC current for the grid 30 using the inverter 80.

There is no limitation made herein to a number of positions operable in the switching circuitry of the DC charger 50 or to a number of switches used for achieving select modes of operation. Furthermore, embodiments are contemplated to include a switching circuit in one or more of the inverter 80, the controller 14 and rectifier 70, and certain embodiments may include diodes (not shown) in the charging station 10 for maintaining current flow in one select direction.

The controller 14 can be implemented as any suitable hardware, processor-executed software, switch driver circuitry, memory equipped processor-executed firmware, programmable logic, or combinations thereof, which are operatively coupled to the DC charger 50 to selectively switch the DC charger 50 from the first mode to the second mode and perform other switching control functionality for the charger operations described herein. The controller 14 may send an electrical signal or a message including control commands or instructions to the DC charger 50 for operating the switching circuit 200 in the first position or the second position. Generally, the controller 14 provides the mode signal to the switching circuit 200. The controller 14 may use a smart device or communicate a message to the switch circuit 200 based on instructions stored in the previously mentioned memory.

Figure 4:
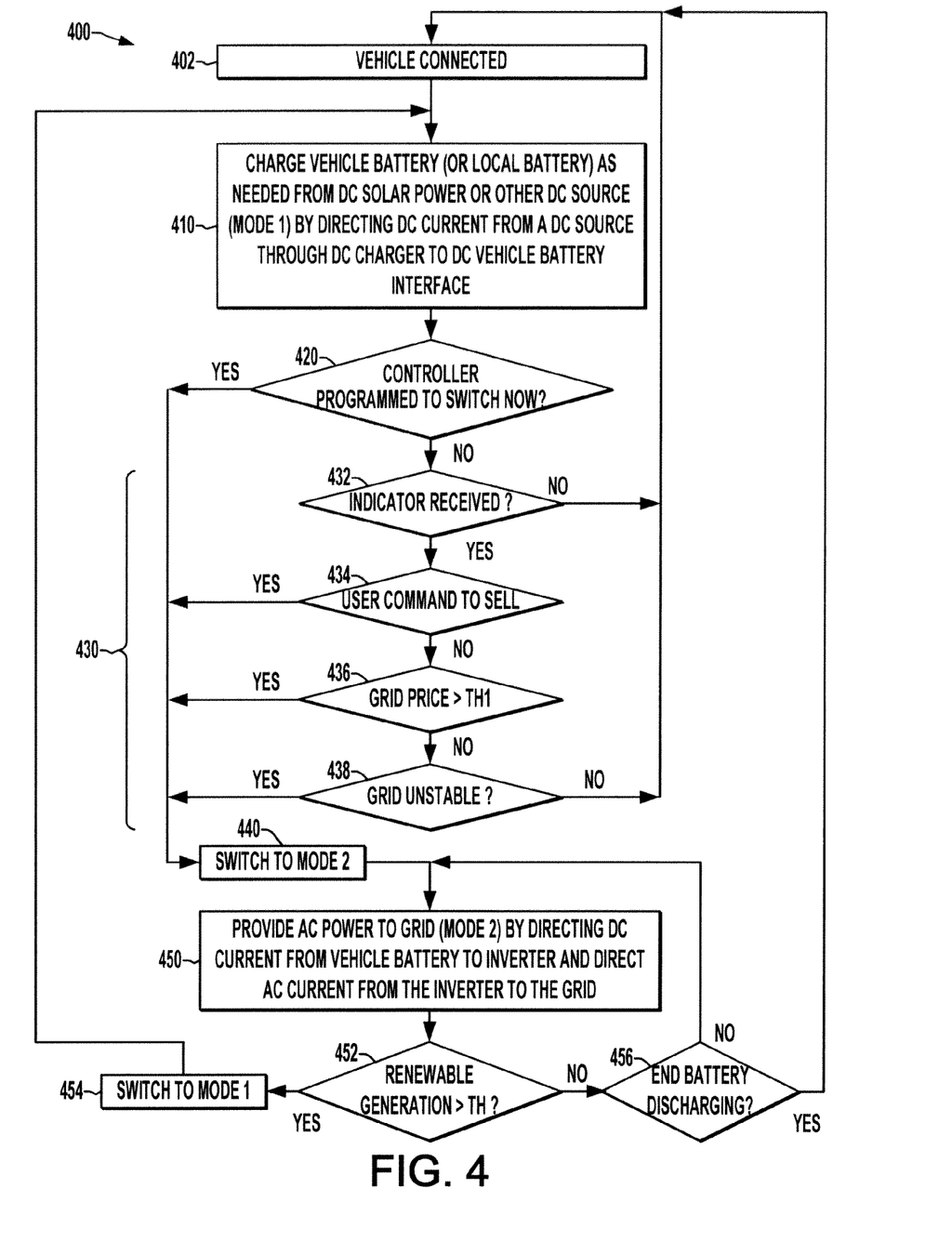

FIG. 4 is a flow diagram illustrating an exemplary mode selection process 400 for a PEV charging station according to various aspects of the disclosure. The PEV connects to the charger station at 402, for example, using the vehicle battery interface 60 and cable 62 shown in FIG. 1. The vehicle battery is charged as needed at 410. As mentioned, the DC photovoltaic or another DC source may direct DC current through the DC charger to the vehicle battery interface. The operation of charging the vehicle battery is thus provided in a first mode at 410. Similarly, the local battery may be charged, as needed, using a DC source.

With continued reference to FIG. 4, the controller continues to operate the DC charger in the first mode until a determination is made to switch modes at 420, 430. In one embodiment, the controller may be programmed to switch the operating mode to the second mode at 420. More particularly, a preprogrammed instruction (e.g., entered by a user via a user interface 12 or programmed by an external device via a communications interface 16 in FIG. 1) may direct the controller to switch the DC charger to operate in the second mode when a select condition is met. In one embodiment, the condition may set the mode change to occur at a certain time or during certain times. For example, the controller may be programmed to switch the mode during daytime hours. In another embodiment, the controller may be preprogrammed to switch modes when the vehicle battery becomes full, or when a certain amount of surplus power is stored in the battery. If such a programmed event occurs (YES at 420), the process 400 switches to the second mode at 440.

With continued reference to FIG. 4, if no instruction is programmed, the controller selectively changes the mode of operation to the second (battery discharge) mode when an indicator is received at 430. The indicator can be provided from an external information source. For example, the external information source may be the utility company, which sets rates for the purchase of AC power. The indication may be received as a communication along the grid as a power line communication. For example, the grid may communicate a carbon dioxide ($CO_2$) content of grid energy. The external information source may include a vehicle navigation system 350 (FIG. 3), which can communicate a vehicle battery state of charge. Furthermore, the navigation system 350 may communicate an available discharge amount, which is computed using a planned or an expected charge usage for the next trip. The indicator may alternatively be provided through the input/output interface. The controller determines if such an indicator signal or value has been received at 432. If no indicator is received (NO at 432), the controller continues to operate the DC charger in the first mode. However, if an indicator is received (YES at 432), the controller determines the type of indication at 434-438.

A determination is made at 434 as to whether a use input command indicator has been received. This indicator may be provided to the controller using the input/output interface included on the charging station. Alternatively, the command may be communicated to the controller from a remote device. The indicator may be provided in real-time for an immediate switch from the first mode to the second mode. It is contemplated, for example, that a user may become aware of particular destinations to which the PEV may be driven and the current charge state of the vehicle battery is more than what is needed for the planned trip(s). The user may select to sell excess DC power that is stored in the DC vehicle battery. The command to switch to the second mode at 440 may be made when the user determines that power required for the destinations of which the user needs to drive the vehicle is less than the stored amount. Alternatively, the user may command the controller to sell AC power to the grid at a select time, and such a command may be provided in advance of the designated sell time. If such a command indicator is received (YES at 434), the process proceeds to 440 for switching to the second mode.

If no user command indicator is received (NO at 434), the controller makes a determination at 436 as to whether an indicator signal representing a current price rate has been received at 436. The current price rate in certain embodiments can be a price offered by the utility company for AC power supplied to the AC power grid. At 436, the controller selectively switches the charger to the second mode at 440 if the price is greater than a threshold price stored in the memory (YES at 436).

If the threshold is not met, or no price indicator is received (NO at 436), the controller determines at 438 whether an indicator signal or message is received representing the grid status. Many reasons may cause a power grid to become unstable. For example, a faulted component may drain power from the power grid, making it less stable. Grid hackers can make the grid unstable. Transmission lines may be congested, or even failed. The power grid may also be determined as having an unstable status when the electricity supply is stressed by over-demand. When power grid status is unstable, the power grid is in need of an additional AC power supply. Accordingly, an indicator communicated from an external power source, such as the power grid, indicates a stability of the grid status. If the grid status is indicated as stable (NO at 438), the controller continues to charge the vehicle battery of the connected vehicle in the first mode 410. However, an unstable grid status (YES at 438) causes the controller to switch the mode of operation to the second mode at 440.

With continued reference to FIG. 4, the vehicle battery provides AC power to the AC power grid at 450 by directing DC current from the vehicle battery to the inverter and directing AC current from the inverter to the grid. When the system is operative in the second mode, certain indicators can be used to further determine when to switch and/or return the system to the first mode. For example, the system can determine if there is presence of significant quantities of renewable generation on the grid at 452. An example of a renewable energy generation can include wind generation during periods outside of the peak demand when there is lower consumption of energy, such as during the night. In this manner, the system operates to maximize the use of renewable electricity. The system can be programmed with a threshold for indicating the significant quantity of renewable energy available. One embodiment can be tailored to any relevant metric by which a relative amount of renewable energy generation can be addressed or determined. In addition, the system may obtain the indicator including information relating to a current level of renewable energy generation from any suitable source, such as a reporting service, a utility operator, etc. The system can be programmed in one embodiment to switch the DC charger to the first mode at 454 when the indicator indicates the presence of a significant quantity of renewable generation on the grid, for example where the indicated level exceeds a predetermined threshold amount or value stored in the system (YES at 452).

Otherwise (NO at 452), the controller continues an operation of the DC charger in the second mode until the vehicle battery completes a discharge at 456. In one embodiment, the battery completes the discharge when a certain threshold of DC power is discharged from the battery. In another embodiment, the battery completes the discharge when a certain threshold of power remains in the battery. For example, the controller may be programmed to maintain a certain minimum of DC power in the vehicle battery to provide the PEV with an ability to travel certain distances, such as those programmed into the vehicle navigation system 350. Once the discharge level is met, the controller switches the DC charger from the second mode to again operate in the first mode at 410.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A charging station for a plug-in electric vehicle (PEV), comprising:
    an inverter including an inverter DC input operative to receive DC input power and an inverter AC output operative to provide AC output power to an AC power grid, the inverter being operable to convert the DC input power to the AC output power;
    a DC charger separate from the PEV, including:
        a charger DC input operative to receive power from at least one solar DC power source separate from the PEV,
        a DC vehicle battery interface coupleable to a PEV DC battery connection, and
        a DC charger output coupled to the inverter DC input to provide DC output power to the inverter,
        the DC charger being operative in a first mode to provide power from the charger DC input to a vehicle battery interface for direct DC charging of the vehicle battery without AC conversion and in a second mode to provide power from the vehicle battery interface to the charger DC output without AC conversion; and
    a controller operatively coupled with the DC charger to selectively switch the DC charger from the first mode to the second mode, wherein the controller is operable to receive an indicator from an external information source and to selectively switch the mode of the DC charger between the first and second modes based at least partially on the indicator, and wherein the indicator includes a grid status, where the controller selectively switches the charger to the second mode if the grid status is unstable.

2. The charging station of claim 1, further including a rectifier, the rectifier including:
    a rectifier AC input operative to receive AC power from the AC power grid; and,
    a rectifier DC output operative to selectively convert the AC power to provide DC power to the charger DC input.

3. The charging station of claim 1, comprising a photovoltaic interface coupled with the charger DC input to selectively provide DC power from a connected solar panel DC power source separate from the PEV to charge the vehicle battery.

4. The charging station of claim 3, wherein the photovoltaic interface is further coupled to the DC inverter input to selectively provide power from the solar panel to provide power to the power grid.

5. The charging station of claim 1, the DC charger including a switching circuit operative in the first mode to electrically couple the charger DC input to the vehicle battery interface and in the second mode to electrically couple the vehicle battery interface to the charger DC output.

6. The charging station of claim 1, wherein the external information source is a user-interface operative to receive a user-command.

7. The charging station of claim 1, wherein the indicator includes a current price rate for AC power supplied to the AC power grid, where the controller selectively switches the charger to the second mode if the price rate is greater than a threshold.

8. The charging station of claim 1, wherein the indicator includes an amount of renewable energy generation on the grid, where the controller selectively switches the charger to the first mode if the amount of renewable energy generation on the grid exceeds a predetermined threshold.

9. A method for operating a plug-in electric vehicle (PEV) charging system, the method comprising:
    selectively operating a DC charger separate from the PEV in a first mode, including:
        directing DC current from a solar DC power source separate from the PEV through a DC charger input to the DC charger, and
        directing DC current from the DC charger through a DC vehicle battery interface to a vehicle battery for direct DC charging of the vehicle battery without AC conversion;
    selectively operating the DC charger in a second mode, including:
        directing DC current from the vehicle battery through the DC vehicle battery interface and through a DC charger to an inverter DC input,
        converting the DC current to AC current using an inverter, and
        directing AC current from the inverter through an inverter AC output to an AC power grid;
    selectively operating a switching circuit based on a received indicator;
    making a determination as to whether the received indicator indicates the AC power grid is unstable; and
    selectively entering the second mode based on the determination.

10. The method of claim 9, further including selectively operating a switching circuit in the second mode to electrically couple the charger DC input to the DC vehicle battery interface and in the first mode to electrically couple the DC vehicle battery interface to the charger DC output.

11. The method of claim 9, further including directing DC current from a solar panel separate from the PEV through a photovoltaic interface and through a DC charger input to the DC charger in the first mode.

12. The method of claim 9, further including selectively operating the DC charger in a third mode, including:
    converting AC current from the AC power grid using a rectifier and charging the vehicle battery using DC current from the rectifier.

13. The method of claim 9, further including in a fourth mode, if no PEV is connected to the DC vehicle battery interface:
    directing DC current from a solar panel to the inverter DC input;
    converting the DC current to AC current at the inverter; and
    directing the AC current from the inverter using the inverter to the AC power grid.

14. The method of claim 9, wherein selectively entering the second mode based on the determination comprises entering the second mode if the indicator indicates a current price rate for AC power supplied to the power grid is a preprogrammed threshold.

15. The method of claim 9, including automatically switching to the second mode at a predetermined time.

16. The method of claim 13, further including:
- making a determination as to whether a received indicator includes a quantity of renewable energy generation on the grid; and
- selectively entering the first mode if the amount of renewable energy generation on the grid exceeds a predetermined threshold.

* * * * *